United States Patent
Ikeda

(10) Patent No.: US 12,261,994 B2
(45) Date of Patent: Mar. 25, 2025

(54) DISPLAY SYSTEM, DISPLAY CONTROL DEVICE, AND NON-TRANSITORY COMPUTER READABLE MEDIUM FOR CAUSING IMAGE TO BE DISPLAYED BY PIXEL SET

(71) Applicant: FUJIFILM BUSINESS INNOVATION CORP., Tokyo (JP)

(72) Inventor: Kazutoshi Ikeda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 715 days.

(21) Appl. No.: 16/983,487

(22) Filed: Aug. 3, 2020

(65) Prior Publication Data

US 2021/0281822 A1 Sep. 9, 2021

(30) Foreign Application Priority Data

Mar. 4, 2020 (JP) .................. 2020-037187

(51) Int. Cl.
| | |
|---|---|
| *H04N 13/366* | (2018.01) |
| *G06T 7/70* | (2017.01) |
| *G06T 7/73* | (2017.01) |
| *H04N 13/106* | (2018.01) |
| *H04N 13/302* | (2018.01) |

(Continued)

(52) U.S. Cl.
CPC ............ *H04N 13/368* (2018.05); *G06T 7/70* (2017.01); *G06T 7/73* (2017.01); *H04N 13/106* (2018.05); *H04N 13/302* (2018.05); *H04N 13/305* (2018.05); *H04N 13/351* (2018.05); *H04N 13/366* (2018.05); *H04N 13/376* (2018.05); *H04N 13/398* (2018.05); *G06T 2207/30201* (2013.01)

(58) Field of Classification Search
None
See application file for complete search history.

(56) References Cited

U.S. PATENT DOCUMENTS

| | | | |
|---|---|---|---|
| 9,253,480 B2 | 2/2016 | Ohba et al. | |
| 10,551,546 B2 * | 2/2020 | Fattal | G02B 30/33 |

(Continued)

FOREIGN PATENT DOCUMENTS

| | | |
|---|---|---|
| JP | 2006-262191 A | 9/2006 |
| JP | 2009-192615 A | 8/2009 |

(Continued)

OTHER PUBLICATIONS

Jan. 9, 2024 Office Action issued in Japanese Patent Application No. 2020-037187.

*Primary Examiner* — Mohammed Jebari
(74) *Attorney, Agent, or Firm* — Oliff PLC

(57) ABSTRACT

A display system includes N (N is a natural number) pixel sets, and a processor. The N pixel sets are capable of displaying different images in N directions. The processor is configured to determine a direction of a person, the person being a person able to view each of the N pixel sets, the direction being a direction in which the person is located. The processor is also configured to cause an image to be displayed by a pixel set, the image being an image directed to each of less than N directions including at least the determined direction, the pixel set being at least one of the N pixel sets corresponding to each of the less than N directions.

15 Claims, 4 Drawing Sheets

(51) Int. Cl.
H04N 13/305 (2018.01)
H04N 13/351 (2018.01)
H04N 13/368 (2018.01)
H04N 13/376 (2018.01)
H04N 13/398 (2018.01)

(56) References Cited

U.S. PATENT DOCUMENTS

| | | | |
|---|---|---|---|
| 10,715,791 B2 | 7/2020 | Matson et al. | |
| 10,798,371 B2* | 10/2020 | Fattal | G02B 6/0078 |
| 10,989,962 B2* | 4/2021 | Ma | G02B 5/1819 |
| 2007/0146358 A1* | 6/2007 | Ijzerman | H04N 13/305 |
| | | | 348/E13.058 |
| 2009/0052164 A1* | 2/2009 | Kashiwagi | H04N 13/32 |
| | | | 362/97.2 |
| 2010/0097449 A1* | 4/2010 | Jeong | H04N 13/32 |
| | | | 348/E13.001 |
| 2010/0283839 A1* | 11/2010 | Liu | H04N 13/368 |
| | | | 348/E13.001 |
| 2011/0316987 A1 | 12/2011 | Komoriya et al. | |
| 2012/0062556 A1* | 3/2012 | Yamamoto | H04N 13/366 |
| | | | 345/419 |
| 2012/0113101 A1* | 5/2012 | Yamamoto | H04N 13/106 |
| | | | 345/419 |
| 2012/0229431 A1* | 9/2012 | Hiroki | G09G 3/003 |
| | | | 345/204 |
| 2012/0242569 A1* | 9/2012 | Hamagishi | G02B 30/30 |
| | | | 345/156 |
| 2013/0050418 A1* | 2/2013 | Nishioka | H04N 13/128 |
| | | | 348/51 |
| 2013/0113685 A1* | 5/2013 | Sugiyama | H04N 13/356 |
| | | | 345/32 |
| 2013/0147932 A1* | 6/2013 | Tokunaga | G02B 30/30 |
| | | | 348/51 |
| 2013/0181979 A1* | 7/2013 | Tsukagoshi | H04N 13/351 |
| | | | 345/419 |
| 2014/0035907 A1* | 2/2014 | Hasegawa | G09G 5/14 |
| | | | 345/419 |
| 2014/0035972 A1* | 2/2014 | Hasegawa | H04N 13/398 |
| | | | 345/694 |
| 2014/0036046 A1* | 2/2014 | Hasegawa | H04N 13/31 |
| | | | 348/54 |
| 2015/0085089 A1* | 3/2015 | Shigemura | H04N 13/351 |
| | | | 348/54 |
| 2015/0138327 A1* | 5/2015 | Xu | H04N 13/305 |
| | | | 348/54 |
| 2015/0281682 A1* | 10/2015 | Van Der Horst | H04N 13/373 |
| | | | 348/59 |
| 2016/0014398 A1* | 1/2016 | Kroon | H04N 13/351 |
| | | | 348/59 |
| 2016/0021365 A1* | 1/2016 | Effendi | H04N 13/128 |
| | | | 348/43 |
| 2018/0063518 A1* | 3/2018 | Shigemura | H04N 13/31 |
| 2019/0019218 A1* | 1/2019 | Thompson | H04N 13/398 |
| 2021/0333570 A1* | 10/2021 | Fattal | G02B 6/0036 |

FOREIGN PATENT DOCUMENTS

| | | |
|---|---|---|
| JP | 2012-10086 A | 1/2012 |
| JP | 2012-105101 A | 5/2012 |
| JP | 2012-120194 A | 6/2012 |
| JP | 2012-203230 A | 10/2012 |
| JP | 5100875 B1 | 12/2012 |
| JP | 2013009127 A * | 1/2013 |
| JP | 2013015711 A * | 1/2013 |
| JP | 2015-089104 A | 5/2015 |
| JP | 2018-523321 A | 8/2018 |

* cited by examiner

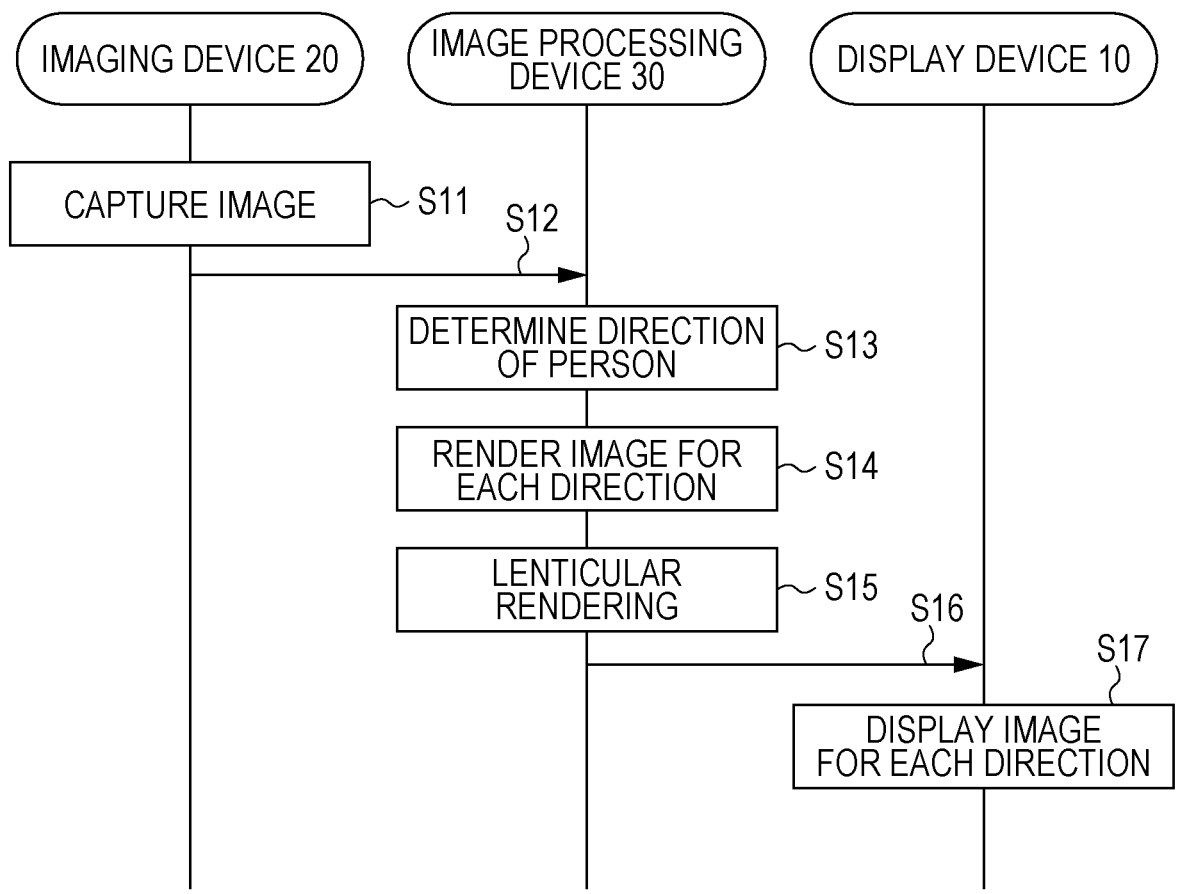

DISPLAY SYSTEM, DISPLAY CONTROL DEVICE, AND NON-TRANSITORY COMPUTER READABLE MEDIUM FOR CAUSING IMAGE TO BE DISPLAYED BY PIXEL SET

CROSS-REFERENCE TO RELATED APPLICATIONS

This application is based on and claims priority under 35 USC 119 from Japanese Patent Application No. 2020-037187 filed Mar. 4, 2020.

BACKGROUND

(i) Technical Field

The present disclosure relates to a display system, a display control device, and a non-transitory computer readable medium.

(ii) Related Art

Japanese Translation of PCT Application Publication No. 2018-523321 describes a technique with which a display for the right eye and a display for the left eye are provided, and an image of a different viewpoint is prepared for the direction of each display to thereby achieve a stereoscopic vision.

A technique called integral imaging exists as an example of a method for displaying different images in plural directions. This method includes disposing an array of microlenses on a display, and causing each pixel to display an image in a different direction, thus achieving a stereoscopic vision. With this technique, to present a different image to a person present in each of plural directions, a different image signal is generated for each set of pixels assigned to each corresponding direction. This configuration results in a number of rendering processes being performed in parallel, the number being equal to the number of directions in which different images can be displayed. This leads to a very large processing load.

SUMMARY

Aspects of non-limiting embodiments of the present disclosure relate to reducing the load of image processing in comparison to a case in which an image is presented to each of persons located in plural directions when there are an indefinite number of persons.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display system including N (N is a natural number) pixel sets, and a processor. The N pixel sets are capable of displaying different images in N directions. The processor is configured to determine a direction of a person, the person being a person able to view each of the N pixel sets, the direction being a direction in which the person is located. The processor is also configured to cause an image to be displayed by a pixel set, the image being an image directed to each of less than N directions including at least the determined direction, the pixel set being at least one of the N pixel sets corresponding to each of the less than N directions.

BRIEF DESCRIPTION OF THE DRAWINGS

Exemplary embodiment of the present disclosure will be described in detail based on the following figures, wherein:

FIG. 7 illustrates an exemplary operation procedure for a display process.

DETAILED DESCRIPTION

1. Exemplary Embodiment

Figure 1:
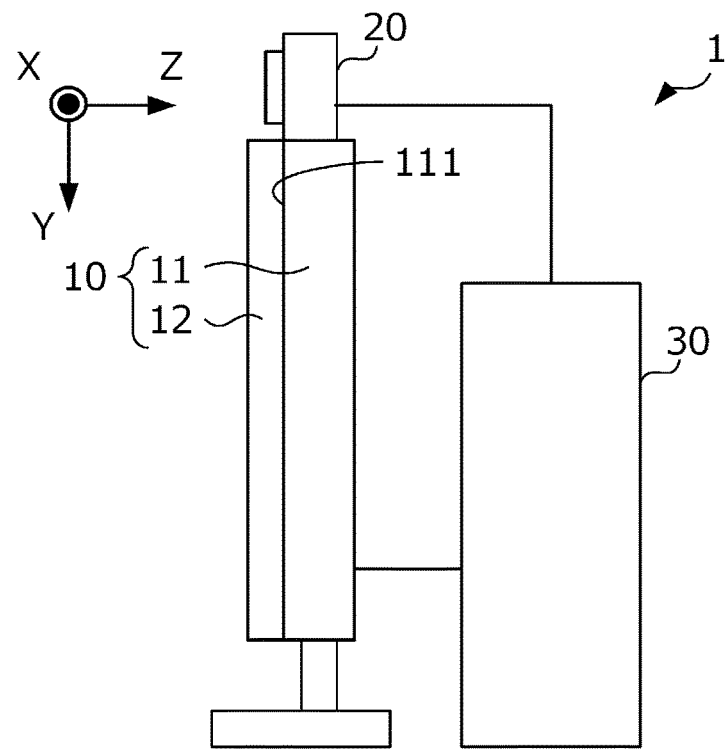
FIG. 1 illustrates the general arrangement of a multi-directional display system according to an exemplary embodiment.

FIG. 1 illustrates the general arrangement of a multi-directional display system 1 according to an exemplary embodiment. The multi-directional display system 1 displays different images in plural directions. The multi-directional display system 1 is an example of a "display system" according to the exemplary embodiment of the present disclosure. The multi-directional display system 1 includes a display device 10, an imaging device 20, and an image processing device 30.

The display device 10 displays an image. The display device 10 has the function of displaying different images in plural directions. The display device 10 includes a display body 11, and a lenticular sheet 12. The display body 11 displays an image by use of light emitted from plural pixels arranged in a planar fashion. Although the display body 11 is, for example, a liquid crystal display, the display body 11 may be an organic electro-luminescence (EL) display, a plasma display, or other suitable displays.

The lenticular sheet 12 is attached on a display surface 111 of the display body 11. FIG. 1 depicts three-dimensional coordinate axes represented by an X-axis (axis in the horizontal direction) and a Y-axis (axis in the vertical direction), which are defined as the coordinate axes on a plane along the display surface 111, and a Z-axis whose positive direction is taken to be the direction opposite to the normal to the display surface 111. In the following description, a direction indicated by an arrow representing each axis will be referred to as positive direction, and the direction opposite to the positive direction will be referred to as negative direction. Further, the directions along the X-axis, the Y-axis, and the Z-axis will be respectively referred to as "X-axis direction", "Y-axis direction", and "Z-axis direction".

The lenticular sheet 12 is formed by an arrangement of elongate convex lenses each having a part-cylindrical shape. The lenticular sheet 12 is attached on a side of the display surface 111 located in the negative Z-axis direction. The relationship between the lenticular sheet 12, and the pixels of the display body 11 will be described below with reference to FIG. 2.

Figure 2:
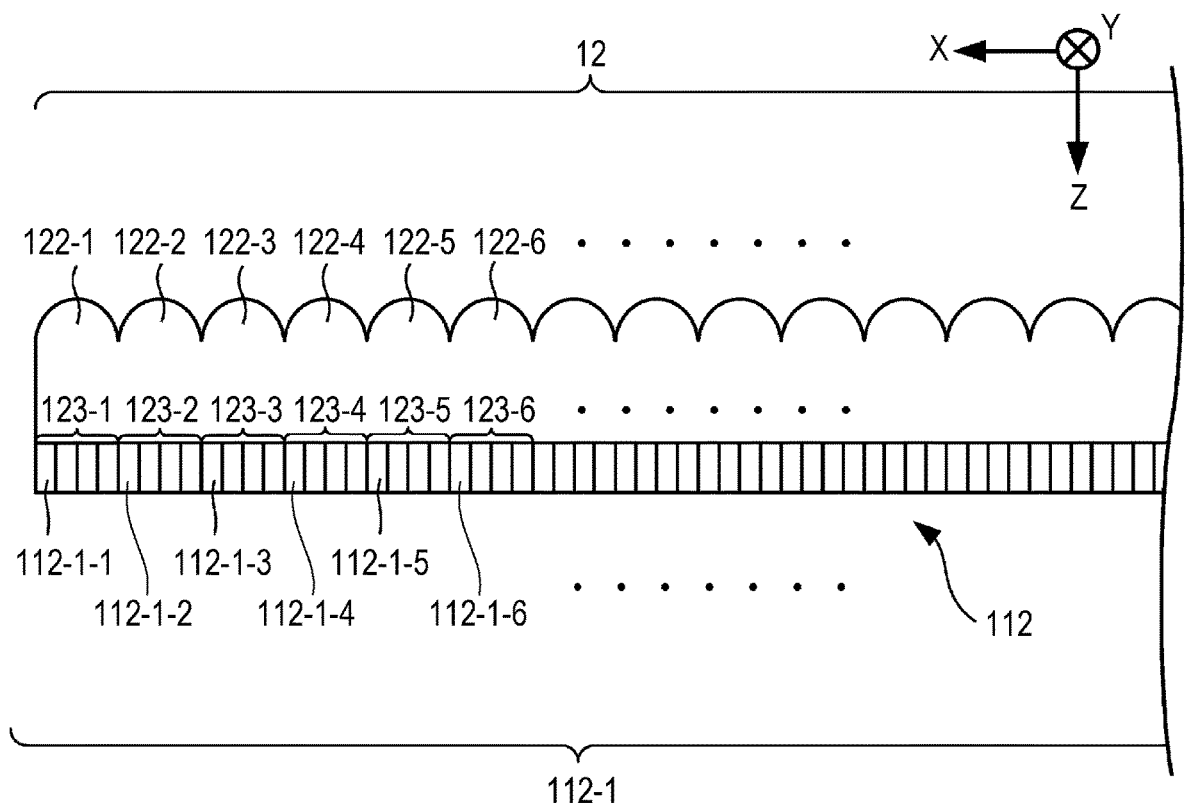
FIG. 2 illustrates a lenticular sheet in enlarged view.

FIG. 2 illustrates the lenticular sheet 12 in enlarged view. FIG. 2 is a schematic illustration, as viewed in the positive Y-axis direction, of the lenticular sheet 12, and a pixel part 112 of the display body 11.

The lenticular sheet 12 includes plural lens parts 122-1, 122-2, 122-3, 122-4, 122-5, 122-6, and so on (to be referred to as "lens part 122" or "lens parts 122" hereinafter when no distinction is made between individual lens parts). The pixel part 112 includes a pixel set 112-1. The pixel set 112-1 includes a pixel 112-1-1, a pixel 112-1-2, a pixel 112-1-3, a pixel 112-1-4, a pixel 112-1-5, a pixel 112-1-6, and so on.

As described above, each of the lens parts 122 is an elongate convex lens with a part-cylindrical shape. The lens parts 122 are arranged side by side in the X-axis direction. In other words, the lens parts 122 are arranged with their longitudinal direction extending along the Y-axis. In the case of FIG. 2, for example, opposed regions 123-1, 123-2, 123-3, 123-4, 123-5, 123-6, and so on (to be referred to as "opposed region 123" or "opposed regions 123" hereinafter when no distinction is made between individual opposed regions), which are regions opposed to the lens parts 122, each include four pixels arranged side by side in the X-axis direction.

For ease of illustration, each opposed region 123 is depicted in FIG. 2 to include four pixels arranged side by side in the X-axis direction. In practice, each opposed region 123 of the display body 11 includes a set of N pixels (N is a natural number). The number N in the exemplary embodiment is greater than four. Details in this regard will be given later.

Each pixel of the pixel set 112-1 is positioned at the end in the positive X-axis direction of the corresponding opposed region 123. A light ray emitted by each pixel of the pixel set 112-1 travels in the negative Z-axis direction, and is refracted in the same direction (to be referred to as "common direction" hereinafter) at the end in the positive X-axis direction of the corresponding lens part 122. Consequently, the light ray emitted by each pixel of the pixel set 112-1 reaches an eye of a person located in the common direction in which the light ray is refracted, thus displaying an image.

The same as mentioned above applies to pixel sets other than the pixel set 112-1, each of which is a set of pixels located at the same position in each corresponding opposed region 123. Light rays from the pixels of each pixel set are refracted in the same direction in the corresponding lens parts 122, and thus reach an eye of a person located in the common direction corresponding to the pixel set to thereby display an image. As described above, the display device 10 includes N pixel sets capable of displaying different images in N directions. The N pixels sets are arranged side by side in the X-axis direction.

Figure 3:
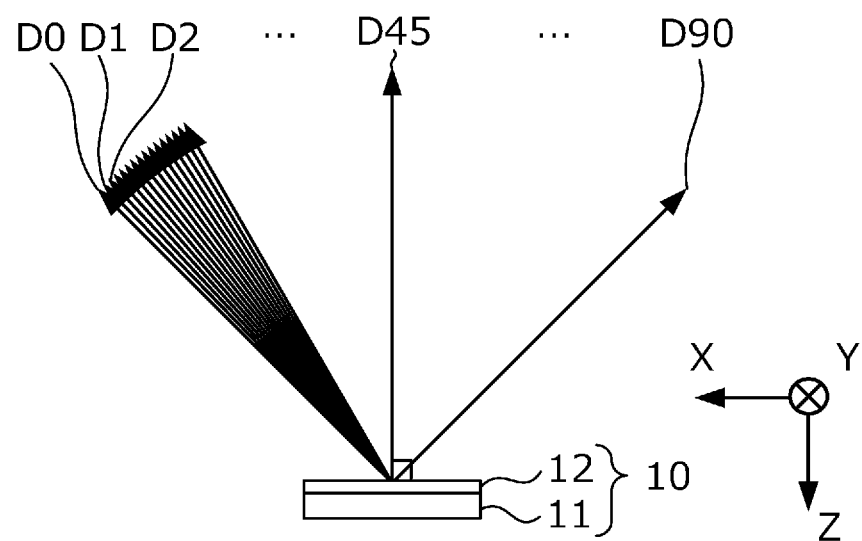
FIG. 3 illustrates an example of directions in which images are displayed.

FIG. 3 illustrates an example of directions in which images are displayed. FIG. 3 illustrates the display device 10 (the display body 11 and the lenticular sheet 12) as viewed in the positive Y-axis direction. The display device 10 displays a different image in each of 91 different display directions such as display directions D0, D1, D2, D45, and D90. In other words, in the exemplary embodiment, the display device 10 includes 91 pixel sets.

The display direction D45 coincides with the direction of the normal to the display surface 111. The angle of each display direction differs by one degree. In other words, the display directions D0 and D90 each make an angle of 45 degrees with the display direction D45. In the following description, angles corresponding to directions located on the same side as the display direction D0 will be represented by negative values, and angles corresponding to directions located on the same side as the display direction D90 will be represented by positive values (which means that the display direction D0 corresponds to −45 degrees, and the display direction D90 corresponds to 45 degrees).

The imaging device 20 is, for example, a digital camera. The imaging device 20 is mounted vertically above the display device 10. The imaging device 20 has a lens directed in a direction (imaging direction) in which the display surface 111 is directed. The imaging device 20 captures, within its angle of view, images corresponding to all of the display directions depicted in FIG. 3. The display device 10 and the imaging device 20 are electrically connected with the image processing device 30 by a cable or other suitable connection. Alternatively, this connection may be made through wireless communication.

The image processing device 30 performs processing related to an image displayed by the display device 10 and an image captured by the imaging device 20.

Figure 4:
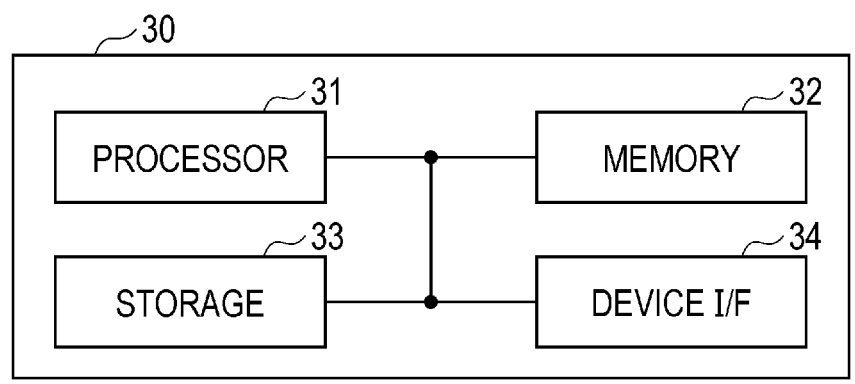
FIG. 4 illustrates the hardware components of an image processing device.

FIG. 4 illustrates the hardware components of the image processing device 30. The image processing device 30 is a computer including a processor 31, a memory 32, a storage 33, and a device I/F 34. The processor 31 includes, for example, a processing unit such as a central processing unit (CPU), a register, and a peripheral circuit. The processor 31 is an example of a "processor" according to the exemplary embodiment of the present disclosure.

The memory 32 is a recording medium that is readable by the processor 31. The memory 32 includes, for example, a random access memory (RAM), and a read-only memory (ROM). The storage 33 is a recording medium that is readable by the processor 31. The storage 33 includes, for example, a hard disk drive, or a flash memory. By using the RAM as a work area, the processor 31 executes a program stored in the ROM or the storage 33 to thereby control operation of each hardware component.

The device I/F 34 serves as an interface (I/F) with two devices including the display device 10 and the imaging device 20. With the multi-directional display system 1, the processor 31 controls various components by executing a program, thus implementing various functions described later. An operation performed by each function is also represented as an operation performed by the processor 31 of a device that implements the function.

Figure 5:
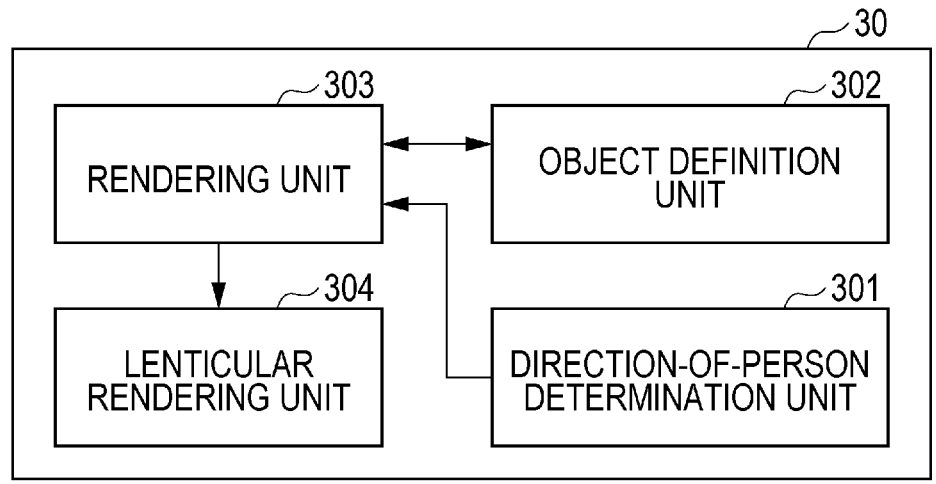
FIG. 5 illustrates functional components implemented by an image processing device.

FIG. 5 illustrates functional components implemented by the image processing device 30. The image processing device 30 includes a direction-of-person determination unit 301, an object definition unit 302, a rendering unit 303, and a lenticular rendering unit 304. The direction-of-person determination unit 301 determines the direction in which a person able to view each pixel set of the display device 10 described above is located with respect to the display device 10 (to be sometimes referred to as "person's direction" or "direction of a person" hereinafter).

For example, the direction-of-person determination unit 301 acquires an image captured by the imaging device 20, and recognizes, from the captured image, a person's face appearing in the image by use of a known face recognition technique. The direction-of-person determination unit 301 determines that a person whose face has been recognized is able to recognize the display surface 111 (i.e., pixel sets). The direction-of-person determination unit 301 then determines, based on where the recognized face is located within the image, the direction in which the person corresponding to the face is located. For example, the direction-of-person determination unit 301 determines a person's direction by using a direction table that associates the coordinates of each pixel with the direction in real space.

For example, the direction table is prepared in advance by the provider of the multi-directional display system 1 by placing an object in a specific direction in real space, and finding where the object appears within an image. In the exemplary embodiment, a person's direction is represented by, for example, an angle that the person's direction makes with the direction of the normal to the display surface 111 (the same direction as the display direction D45 depicted in FIG. 3). Specifically, a person's direction is represented by an angle that the person's direction makes in the X-axis direction with the direction of the normal, and an angle that the person's direction makes in the Y-axis direction with the direction of the normal.

In this regard, the angle that a person's direction makes in the X-axis direction with the direction of the normal refers to, with a vector representing the person's direction being projected on a plane including the X-axis and the Z-axis, an angle made by the projected vector with the direction of the normal. Likewise, the angle that a person's direction makes in the Y-axis direction with the direction of the normal refers to, with a vector representing the person's direction being projected on a plane including the Y-axis and the Z-axis, an angle made by the projected vector with the direction of the normal. These angles will be described below with reference to FIGS. 6A and 6B.

Figure 6A:
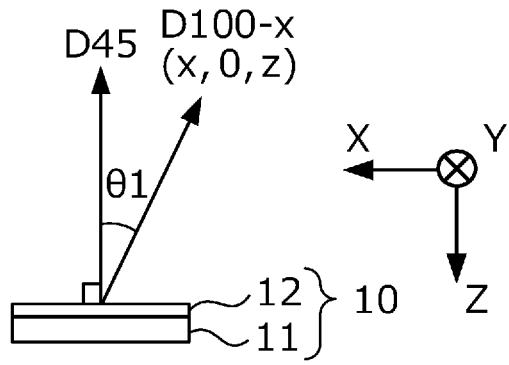
FIGS. 6A and 6B each illustrate an exemplary angle representing a person's direction.
Figure 6B:
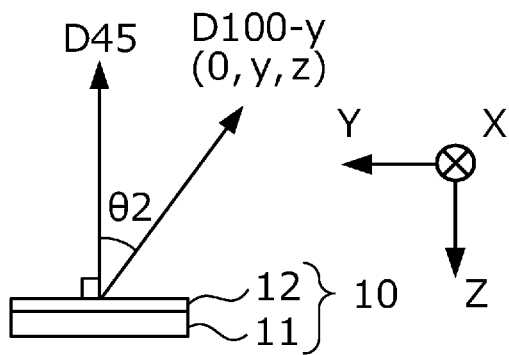

FIGS. 6A and 6B each illustrate an exemplary angle representing a person's direction. In FIGS. 6A and 6B, a person's direction D100 is represented by the coordinates (x, y, z) of a vector in a three-dimensional coordinate system with the center of the display surface 111 as its origin. FIG. 6A depicts a direction of projection D100-x (coordinates (x, 0, z)) in which the person's direction D100 is projected onto a plane including the X-axis and the Z-axis. An angle θ1 made by the direction of projection D100-x and the display direction D45 (the direction of the normal) is the angle that the person's direction D100 makes in the X-axis direction with the direction of the normal.

FIG. 6B depicts a direction of projection D100-y (coordinates (0, y, z)) in which the person's direction D100 is projected onto a plane including the Y-axis and the Z-axis. An angle θ2 made by the direction of projection D100-y and the display direction D45 (the direction of the normal) is the angle that the person's direction D100 makes in the Y-axis direction with the direction of the normal. In this way, the direction-of-person determination unit 301 determines the direction of a person who is able to view each set of pixels, based on the angle θ1 of the person's direction in the X-axis direction and the angle θ2 of the person's direction in the Y-axis direction.

The X-axis direction is an example of a "first direction" according to the exemplary embodiment of the present disclosure, and the Y-axis direction is an example of a "second direction" according to the exemplary embodiment of the present disclosure. The angle θ1 is an example of a "first angle" according to the exemplary embodiment of the present disclosure, and the angle θ2 is an example of a "second angle" according to the exemplary embodiment of the present disclosure. If, for example, one person is present near the display surface 111, the direction-of-person determination unit 301 may determine plural display directions as directions corresponding to the one person. In response to determining each direction of a person, the direction-of-person determination unit 301 supplies directional information representing the determined direction to the rendering unit 303.

In the exemplary embodiment, the multi-directional display system 1 produces a display that stereoscopically represents, as a stereoscopic object, an object to be displayed (to be also referred to simply as "object" hereinafter). The object definition unit 302 stores definition information that defines the stereoscopic object to be displayed (to be referred to as "3D object" hereinafter). The object definition unit 302 stores, for example, a set of coordinates on the surface of a 3D object as definition information. The definition information stored in the object definition unit 302 is referenced by the rendering unit 303.

The rendering unit 303 generates data representing an image to be displayed by each pixel set of the display device 10 (to be referred to as "display image data" hereinafter). Generating display image data as described above will be referred to as image rendering. The rendering unit 303 renders, based on definition information stored in the object definition unit 302, an image of a 3D object as viewed from a direction of a person determined by the direction-of-person determination unit 301.

If each of the directions represented by the angles θ1 and θ2 illustrated in FIGS. 6A and 6B is determined as a person's direction, the rendering unit 303 generates display image data representing a 3D object as viewed from each of the direction of the angle θ1 and the direction of the angle θ2. If plural directions are determined, the rendering unit 303 renders an image of a 3D object for each direction.

For example, the rendering unit 303 determines the distance to a person whose direction has been determined, and generates display image data in accordance with the determined distance. For example, based on the size of a recognized face within an image, the rendering unit 303 determines the distance to a person corresponding to the face. Other known methods may be used to determine the distance to a person. If the determined distance is less than a first threshold, the rendering unit 303 generates image data to be displayed by a pixel set whose display direction is within the range of the first angle.

The rendering unit 303 likewise generates image data for other pixel sets. Specifically, if the determined distance is greater than or equal to the first threshold and less than the second threshold, the rendering unit 303 generates image data to be displayed by a pixel set whose display direction is within the range of the second angle, and if the determined distance is greater than or equal to the second threshold and less than a third threshold, the rendering unit 303 generates image data to be displayed by a pixel set whose display direction is within the range of a third angle. If the determined distance is greater than or equal to the third threshold, the rendering unit 303 generates image data to be displayed by a pixel set whose display direction is within the range of a fourth angle.

For example, the first, second, and third thresholds are respectively set as 30 cm, 100 cm, and 200 cm, and the first, second, and third angles are respectively set as 11, 7, and 3 degrees. If, for example, a person is located in the direction of 30 degrees, and the distance to the person is greater than or equal to 30 cm and less than 100 cm, then the rendering unit 303 generates image data to be displayed by a pixel set whose display direction is within the range of 27 to 33 degrees. At that time, the rendering unit 303 generates image data for displaying an object's image such that the greater the display direction deviates from 30 degrees, the greater the viewpoint of the displayed object's image is shifted relative to that of an object's image directed to the display direction of 30 degrees.

Further, for example, the rendering unit 303 may, if a configuration for separately detecting the right and left eyes of a person whose direction has been determined is further provided, generate slightly shifted display image data for each eye, thus enabling a stereoscopic vision due to the parallax of the two eyes. If, for example, the position of the right eye of a person is detected to be 32 degrees, and the position of the left eye of the person is detected to be 30 degrees, the rendering unit 303 generates image data for causing a pixel set corresponding to the display direction of 32 degrees and a pixel set corresponding to the display direction of 30 degrees to generate and display slightly shifted images of an object.

For example, the rendering unit 303 may, from the size and height position of the face of a person, determine whether the person is an adult or a child, and use different thresholds and angles depending on the determination result. Further, if, for example, the direction-of-person determination unit 301 is to determine the directions of the left and right eyes of a person by use of a known technique for detecting the position of each eye from an image, the rendering unit 303 may generate image data to be displayed by each pixel set corresponding to a display direction in between the respective determined directions of the left and right eyes.

The rendering unit 303 supplies the rendered display image data, which is image data used for displaying an image, to the lenticular rendering unit 304. If plural pieces of such display image data are generated, the rendering unit 303 supplies the plural pieces of display image data to the lenticular rendering unit 304.

The lenticular rendering unit 304 renders, by use of a lenticular method, an image represented by the supplied display image data. Rendering using a lenticular method refers to generating image data for causing a pixel set to display an image, the pixel set being a set of pixels corresponding to a direction in which to display the image, the image data being representative of the values of all pixels. For example, if five directions are determined as directions of persons, the lenticular rendering unit 304 generates image data for causing each of pixel sets corresponding to the five directions to display an image, the image being an image of a 3D object viewed from each corresponding direction.

If plural directions are determined with respect to a single person, the lenticular rendering unit 304 generates image data for causing plural pixel sets corresponding to these display directions to display the same image of a 3D object. In this way, the lenticular rendering unit 304 generates display image data for causing an image to be displayed by a pixel set, the image being an image directed in a direction of a person determined by the direction-of-person determination unit 301, the pixel set being a pixel set corresponding to the direction.

As described above, the display device 10 includes N (91 in the exemplary embodiment) pixel sets. These pixel sets include a pixel set corresponding to a display direction not determined to be a direction in which a person is present. For such a pixel set corresponding to a display direction in which no person is present, the lenticular rendering unit 304 generates, for example, image data with all pixels set to the minimum value without performing any image rendering.

Each pixel is set to the minimum value in the above-mentioned case for the reason described below. When a pixel is emitting light, this exerts influence, in a greater or lesser degree, on light emitted by an adjacent pixel. For this reason, each pixel is set to the minimum value to minimize such influence. As described above, for a pixel set corresponding to a direction not determined by the direction-of-person determination unit 301 to be a direction in which a person is present, the lenticular rendering unit 304 generates, for example, image data with each pixel set to the minimum value so that no image is displayed.

Although it may not be impossible that all of N display directions are simultaneously determined to be directions in each of which a person is present, in practice, such a situation can only occur in exceptional circumstances in which a large number of persons are positioned in front of the display surface 111 specifically for such purpose. Accordingly, the lenticular rendering unit 304 generates display image data for causing images directed to less than N directions to be displayed by pixel sets corresponding to each of the less than N directions.

The lenticular rendering unit 304 transmits the generated display image data to the display device 10. The display device 10 displays, via the corresponding pixel set, each image represented by the transmitted display image. As described above, the rendering unit 303 and the lenticular rendering unit 304 each cause a pixel set to display an image representing a stereoscopic object as viewed from the direction of the angle $\theta 2$, the pixel set being a pixel set that displays an image in the direction of the angle $\theta 1$ illustrated in FIG. 6A.

Further, the rendering unit 303 and the lenticular rendering unit 304 each cause an image to be displayed by a pixel set, the image being an image directed to less than N directions including at least the direction of a person determined by the direction-of-person determination unit 301, the pixel set corresponding to each of the less than N directions.

As a result of the above-mentioned configuration, each device included in the multi-directional display system 1 performs a display process that displays different images for different persons present in plural directions.

FIG. 7 illustrates an exemplary operation procedure for the display process. First, the imaging device 20 captures an image (step S11), and transmits the captured image to the image processing device 30 (step S12). The image processing device 30 (direction-of-person determination unit 301) determines the direction of a person appearing in the transmitted image (step S13).

Subsequently, the image processing device 30 (rendering unit 303) renders an image to be displayed for each determined direction (step S14). The image processing device 30 (lenticular rendering unit 304) then performs rendering by a lenticular method, by use of display image data generated by the rendering performed for each direction (step S15).

Then, the image processing device 30 (lenticular rendering unit 304) transmits, to the display device 10, display image data generated by the rendering (step S16). By using the transmitted image data, the display device 10 displays an image for each determined direction (step S17). The operations from step S11 to S17 are repeated while the display device 10 displays an image for each direction in which a person is present.

In the exemplary embodiment, an image is rendered as described above for each determined direction of a person. At that time, no image is displayed in a direction in which no person is present. No rendering thus needs to be performed for such a direction. In this way, the exemplary embodiment makes it possible to reduce the load of image processing (mostly rendering performed by the rendering unit 303) in comparison to a case in which, for example, an image is presented to each of persons located in plural directions when there are an indefinite number of persons.

In the exemplary embodiment, the pixels of each pixel set are arranged side by side in the X-axis direction, and an image of a 3D object viewed from a different direction is displayed for each direction of a person represented by the angle θ1 in the X-axis direction depicted in FIG. 6A. Further, although the pixels of each pixel set are not arranged side by side in the Y-axis direction, an image of a 3D object viewed from the direction of the angle θ2 in the Y-axis direction depicted in FIG. 6B is generated. Therefore, a stereoscopic display is created also in a direction (the Y-axis direction in the exemplary embodiment) other than the direction (the X-axis direction in the exemplary embodiment) in which the pixels of each pixel set are arranged side by side.

2. Modifications

The exemplary embodiment mentioned above is only illustrative of one exemplary embodiment of the present disclosure, and may be modified as described below. The exemplary embodiment and its various modifications may be implemented in combination as necessary.

2-1. Method for Determining Person's Direction

In the foregoing description of the exemplary embodiment, the direction-of-person determination unit 301 determines the direction of a person by recognizing the person's face. However, the direction-of-person determination unit 301 may not necessarily determine a person's direction by this method. Alternatively, for example, the direction-of-person determination unit 301 may determine the direction of a person by detecting an eye of the person from an image, or may determine the direction of a person by detecting the whole body of the person.

If a person is carrying a communication terminal including a positioning unit (a unit that measures the position of the communication terminal), such as a smartphone, the direction-of-person determination unit 301 may acquire positional information representing a position measured by the communication terminal, and determine a person's direction from the relationship between the acquired positional information, and previously stored positional information of the display device 10. In that case, the person's direction is determined even without the imaging device 20.

2-2. Assignment of Pixel Sets

In the foregoing description of the exemplary embodiment, if plural directions are determined with respect to a single person, the lenticular rendering unit 304 assigns plural pixels sets corresponding to the plural display directions, as pixel sets used for displaying the corresponding images to the person. However, this is not intended to be limiting. Alternatively, the lenticular rendering unit 304 may use another method to assign plural pixel sets as pixel sets used for displaying the corresponding images to a specific person.

For example, the lenticular rendering unit 304 generates display image data for causing a number of pixel sets to display an image, the number varying according to the manner of change of a position, the position being the position in real space of a person whose direction has been determined by the direction-of-person determination unit 301, the image being an image directed to the person. The manner of change of the position of a person in real space in this context refers to, for example, the direction of movement of the person's position. The direction of movement of the person's position can be determined by, for example, the direction-of-person determination unit 301 determining, in addition to the direction of the person, the distance to the person.

For example, the direction-of-person determination unit 301 determines, based on the size of a recognized face within an image, the distance to a person corresponding to the face. Other known methods may be used to determine the distance to a person. If the determined distance changes to become shorter, that is, if a person moves in a direction toward the display device 10, for example, the lenticular rendering unit 304 increases the number of pixel sets assigned to the person.

Conversely, if a person moves in a direction away from the display device 10, the lenticular rendering unit 304 decreases the number of pixel sets assigned to the person. In this regard, as depicted in FIG. 3, the light rays emitted by pixels arranged side by side in the X-axis direction in each opposed region 123 of the display device 10 are refracted by the lenticular sheet 12 so as to travel radially as described above. Thus, the closer a person is to the display device 10, the greater the number of pixels whose light rays reach an eye of the person.

In this regard, supposing that only one pixel set displays an image to a person located near the display device 10, other pixel sets not displaying an image are also visible to the person at the same time. Thus, if the pixels of those non-displaying pixel sets are being set to the minimum value, and the entire corresponding surface is thus showing a black image, then the image reaching an eye of the person also appears to be blackish. Further, if pixel sets simultaneously showing different images are visible from the left and right eyes, this results in two such images appearing to be mixed together.

By contrast, if pixel sets visible to the left and right eyes of a person are showing the same image, then the image can be viewed accurately. In this regard, techniques exist that achieve a stereoscopic vision by showing slightly shifted images to the left and right eyes. Even in such cases, if an image different from the image intended for the left eye and the image intended for the right eye enters the left and right eyes, this makes it difficult to accurately view a stereoscopic image. It thus follows that, to allow an image to be viewed accurately, the number of pixel sets assigned to a person may be increased. However, as the number of pixel sets assigned to each one person increases, the number of pixel sets that can be assigned to other persons decreases.

Accordingly, the number of pixel sets assigned to a person is varied based on the direction of movement of the person as described above. In comparison to assigning pixel sets in a fixed manner, this configuration allows the person to view a more accurate image even as the person moves closer to the display device 10, and also allows a greater number of pixel sets to be left for assignment to other persons, thus allowing a greater number of persons to view accurate images.

The manner of change of the position of a person in real space may be the speed of movement of the person. In that case, for example, the greater the speed of movement of a person, the greater the number of pixel sets assigned by the lenticular rendering unit 304 to the person. In comparison to assigning pixel sets in a fixed manner, this configuration allows the person to view a more accurate image irrespective of the speed of movement of the person, and also allows a greater number of persons to view accurate images.

The manner of change of the position of a person in real space may be the amount of time for which the person's position remains fixed. In that case, for example, the greater the amount of time for which a person's position remains fixed, the greater the number of pixel sets assigned by the lenticular rendering unit 304 to the person. In comparison to assigning pixel sets in a fixed manner, this configuration allows a person who keeps viewing an image for a longer time to view a more accurate image, and also allows a greater number of persons to view accurate images.

Alternatively, the lenticular rendering unit 304 may generate display image data for causing a number of pixel sets to display an image, the number varying simply according to the position in real space of a person whose direction has been determined by the direction-of-person determination unit 301, rather than the manner of change of the person's position as described above, the image being an image directed to the person.

In that case, for example, the closer a person's position is to the display device 10, the greater the number of pixel sets assigned by the lenticular rendering unit 304 to the person. In comparison to assigning pixel sets in a fixed manner, this configuration allows the person to view a more accurate image irrespective of where the person is located, and also allows a greater number of persons to view accurate images.

The lenticular rendering unit 304 may generate display image data for causing a number of pixel sets to display an image, the number varying according to the number of persons whose direction has been determined by the direction-of-person determination unit 301, the image being an image directed to each person. In that case, for example, the smaller the number of persons whose direction has been determined, the greater the number of pixel sets assigned by the lenticular rendering unit 304 to each person.

This means that, conversely, the greater the number of persons whose direction has been determined, the smaller the number of pixel sets assigned by the lenticular rendering unit 304 to each person. In comparison to assigning pixel sets in a fixed manner, this configuration allows for effective utilization of pixel sets irrespective of the number of persons.

The lenticular rendering unit 304 may generate display image data for causing a number of pixel sets to display an image, the number varying according to a movement performed by a specific part of a person whose direction has been determined by the direction-of-person determination unit 301, the image being an image directed to the person. A specific part refers to, for example, a part of a person's body, such as a hand, a foot, an eye, the mouth, or the face. In that case, for example, the direction-of-person determination unit 301 recognizes the position or shape of a person's specific part within an image, and notifies the lenticular rendering unit 304 of the recognized position or shape.

The lenticular rendering unit 304 determines the movement of the specific part based on how the position or shape, of which the lenticular rendering unit 304 has been notified, changes with time. For example, in response to a person's hand moving up, the lenticular rendering unit 304 may increase the number of pixel sets assigned to the person, and in response to a person's hand moving down, the lenticular rendering unit 304 may decrease the number of pixel sets assigned to the person. This allows a person viewing an image to change the accuracy of the image on the person's own will.

2-3. Viewpoint of Stereoscopic Object

In the foregoing description of the exemplary embodiment, the rendering unit 303 generates display image data representing a 3D object as viewed from each of the direction of the angle θ1 and the direction of the angle θ2 illustrated in FIGS. 6A and 6B. However, the rendering unit 303 may not necessarily render a 3D object in this manner. Alternatively, the rendering unit 303 may generate display image data representing a 3D object as viewed from a viewpoint that varies according to the manner of change of a position, the position being a position in real space of a person whose direction has been determined by the direction-of-person determination unit 301.

The manner of change of the position of a person in real space in this context refers to, for example, the direction of movement of the person's position. Specifically, if, for example, a 3D object is a pot, and a person moves in a direction toward the display device 10, then at the point when the person has moved toward the pot to a position within a certain distance from the pot, the rendering unit 303 switches from a viewpoint for viewing the pot from the outside to a viewpoint for viewing the pot from the inside.

If a person moves in a direction away from the display device 10, then at the point when the person has moved a certain distance away from the pot, the rendering unit 303 switches from the viewpoint for viewing the pot from the inside to the viewpoint for viewing the pot from the outside. As a result, the viewer of the display device 10 is able to switch to a viewpoint that shows one of the exterior and interior appearances of the 3D object that the viewer wants to view.

The manner of change of the position of a person in real space may be the speed of movement of the person's position. For example, the rendering unit 303 generates display image data representing a 3D object viewed from a viewpoint, the viewpoint being moved by a greater distance as a person's position moves faster. As a result, when changing the angle from which to view a 3D object, the viewer of the display device 10 is able to switch to the viewer's desired angle more promptly than in a case in which the viewpoint is changed irrespective of the speed of movement.

The manner of change of the position of a person in real space may be the amount of time for which the person's position remains fixed. For example, the rendering unit 303 generates display image data representing a 3D object with the viewpoint moved closer to the 3D object as the amount of time for which a person's position remains fixed increases. As a result, for the viewer of the display device 10, the longer the viewer gazes at an area of interest, the greater the detail of the area displayed to the viewer. No matter which one of the manners of change mentioned above is used, an image of a stereoscopic object may be viewed from a desired angle more easily than in a case in which the viewpoint is fixed.

The lenticular rendering unit 304 may generate display image data representing a 3D object viewed from a viewpoint, the viewpoint varying according to a movement performed by a specific part of a person whose direction has been determined by the direction-of-person determination unit 301. As in the example mentioned above, a specific part refers to, for example, a part of a person's body. For example, when a person moves a hand up and down, the lenticular rendering unit 304 moves the viewpoint up and down, and when a person moves a hand to the left and right, the lenticular rendering unit 304 moves the viewpoint to the left and right. This allows a person viewing an image to change the angle of the image on the person's own will.

In this case, the amount of movement of the viewpoint with respect to a 3D object may be varied according to a change in the amount by which a person has moved a hand up and down or to the left and right. For example, in response to a person moving a hand by an amount corresponding to the angle of three degrees with respect to the display device 10, the viewpoint with respect to the 3D object is moved by 30 degrees, which is greater than the above-mentioned angle. In this way, the angle of the object's image to be displayed may be changed in an exaggerated way relative to the amount of movement of the hand.

2-4. Lenticular Sheet

In the foregoing description of the exemplary embodiment, the lenticular sheet is formed by plural lens parts 122 arranged side by side in the X-axis direction, each lens part 122 being an elongate convex lens having a part-cylindrical shape. However, this is not intended to be limiting. The lenticular sheet may be formed by, for example, plural lens parts arranged side by side in a planar fashion and in a lattice-like form in the X- and Y-axis directions, the lens parts each being a convex lens.

The display body according to this modification includes, in each opposed region opposed to the corresponding lens part, a set of N (N is a natural number) pixels arranged in the X-axis direction, and a set of M (M is a natural number) pixels arranged in the Y-axis direction. This means that the display body includes, in addition to each set of pixels arranged in the X-axis direction, each set of pixels arranged in the Y-axis direction. By using a lenticular method, the lenticular rendering unit 304 performs rendering for each such set of pixels arranged in the Y-axis direction. The display device according to this modification thus displays an image for each direction determined with respect to the X-axis direction and for each direction determined with respect to the Y-axis direction. As a result, for example, different images are displayed for an adult, who generally has a high eye level, and a child, who generally has a low eye level.

2-5. Functional Components

With the multi-directional display system 1, a method for implementing the functions illustrated in FIG. 5 is not limited to the method described above with reference to the exemplary embodiment. For example, if the display device 10 includes hardware components corresponding to those illustrated in FIG. 4, then the display device 10 may implement all the functions depicted in FIG. 5. The display device 10 may have the imaging device 20 incorporated therein.

In that case, the display device 10 alone constitutes an example of the "display system" according to the exemplary embodiment of the present disclosure. As described above, the "display system" according to the exemplary embodiment of the present disclosure may include all of its components within a single enclosure, or may include its components located separately in two or more enclosures. The imaging device 20 may constitute a part of the display system, or may be a component external to the display system.

In the foregoing description of the exemplary embodiment, the direction-of-person determination unit 301 determines the distance to a person, or recognizes the position or shape of a person's specific part within an image. Alternatively, a function for determining the distance, or a function for recognizing the position or shape may be provided separately. Further, for example, the operations performed by the rendering unit 303 and the lenticular rendering unit 304 may be performed by a single function. In short, as long as the functions illustrated in FIG. 5 or other figures are implemented by the multi-directional display system 1 as a whole, the specific configuration of devices that implement each function, and the range of operations performed by each function may be freely determined.

2-6. Processor

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application-Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

2-7. Category of Present Disclosure

The exemplary embodiment of the present disclosure may be understood as, in addition to a display device, an imaging device, and an image processing apparatus, a display system including these devices. The exemplary embodiment of the present disclosure may be also understood as an information processing method for implementing a process performed by each device, or as a program for causing a computer to function, the computer controlling each device. This program may be provided by means of a storage medium in which the program is stored, such as an optical disc. Alternatively, the program may be provided in such a manner that the program is downloaded to a computer via communications lines such as the Internet, and installed onto the computer to make the program available for use.

The foregoing description of the exemplary embodiment of the present disclosure has been provided for the purposes of illustration and description. It is not intended to be exhaustive or to limit the disclosure to the accurate forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A display system comprising:
N (N is a natural number) pixel sets capable of displaying different images in N directions, wherein the N pixel sets are arranged side by side in a first direction but are not arranged side by side in a second direction perpendicular to the first direction; and
a processor configured to
determine a direction of a person based on a first angle and a second angle, the first angle being a direction of the person in the first direction, the second angle being a direction of the person in the second direction, the person being a person able to view each of the N pixel sets, the direction being a direction in which the person is located,
increase a difference between the first and second directions when a distance is less than a predetermined threshold, and to decrease the difference between the first and second direction when the distance is more than the predetermined threshold,
determine a position of both a left eye and a right eye of the person, and
cause at least two of the N pixel sets that displays a first image to display a second image, the first image being an image displayed in a direction of the first angle, the second image being an image representing a stereoscopic object viewed from a direction of the second angle, the chosen pixel sets to display the second image being different pixel sets and resulting in the second image being shifted taking into consideration the position of the left eye and the position of the right eye and a determined distance to the person whose direction has been determined.

2. The display system according to claim 1,
wherein the processor is configured to cause a number of the N pixel sets to display an image, the number varying according to a manner of change of a position, the position being a position in real space of the person whose direction has been determined, the image being an image directed to the person.

3. The display system according to claim 2,
wherein the manner of change of the position includes at least one of a direction of movement of the position, a speed of movement of the position, and an amount of time for which the position remains fixed.

4. The display system according to claim 1,
wherein the processor is configured to cause an image to be displayed, the image being an image of a stereoscopic object viewed from a viewpoint, the viewpoint varying according to a manner of change of a position, the position being a position in real space of the person whose direction has been determined.

5. The display system according to claim 2,
wherein the processor is configured to cause an image to be displayed, the image being an image of a stereoscopic object viewed from a viewpoint, the viewpoint varying according to a manner of change of a position, the position being a position in real space of the person whose direction has been determined.

6. The display system according to claim 3,
wherein the processor is configured to cause an image to be displayed, the image being an image of a stereoscopic object viewed from a viewpoint, the viewpoint varying according to a manner of change of a position, the position being a position in real space of the person whose direction has been determined.

7. The display system according to claim 4,
wherein the manner of change of the position includes at least one of a direction of movement of the position, a speed of movement of the position, and an amount of time for which the position remains fixed.

8. The display system according to claim 1,
wherein the processor is configured to cause a number of the N pixel sets to display an image, the number varying according to a position of the person whose direction has been determined, the image being an image directed to the person.

9. The display system according to claim 1,
wherein the processor is configured to cause a number of the N pixel sets to display an image, the number varying according to a number of the persons whose direction has been determined, the image being an image directed to each of the number of persons.

10. The display system according to claim 1,
wherein the processor is configured to cause a number of the N pixel sets to display an image, the number varying according to a movement performed by a specific part of the person whose direction has been determined, the image being an image directed to the person.

11. The display system according to claim 1,
wherein the processor is configured to cause an image to be displayed, the image being an image of a stereoscopic object viewed from a viewpoint, the viewpoint varying according to a movement performed by a specific part of the person whose direction has been determined.

12. The display system according to claim 10,
wherein the processor is configured to cause an image to be displayed, the image being an image of a stereoscopic object viewed from a viewpoint, the viewpoint varying according to a movement performed by a specific part of the person whose direction has been determined.

13. A non-transitory computer readable medium storing a program causing a computer to execute a process, the computer including N (N is a natural number) pixel sets and a processor, the N pixel sets being capable of displaying different images in N directions, wherein the N pixel sets are arranged side by side in a first direction but are not arranged side by side in a second direction perpendicular to the first direction, the process comprising:
determining a direction of a person based on a first angle and a second angle, the first angle being a direction of the person in the first direction, the second angle being a direction of the person in the second direction, the person being a person able to view each of the N pixel sets, the direction being a direction in which the person is located;
increasing a difference between the first and second directions when a distance is less than a predetermined threshold, and to decrease the difference between the first and second direction when the distance is more than the predetermined threshold,
determining a position of both a left eye and a right eye of the person, and
causing at least two of the N pixel sets that displays a first image to display a second image, the first image being an image displayed in a direction of the first angle, the second image being an image representing a stereoscopic object viewed from a direction of the second angle, the chosen pixel sets to display the second image being different pixel sets and resulting in the second image being shifted taking into consideration the position of the left eye and the position of the right eye and a determined distance to the person whose direction has been determined.

14. The display system according to claim 1, wherein the processor is configured to cause a number of the N pixel sets to display an image, the number of N pixel sets being different for different directions of movement of a position of the person, the position being a position in real space of the person whose direction has been determined, the image being an image directed to the person.

15. The display system according to claim 1, wherein the determination of the direction of the person includes whether the direction is both the first direction and the second direction, and wherein when the direction is both the first direction and the second direction, the second image is displayed in both the first direction and the second direction.

* * * * *